(12) United States Patent
Hansen et al.

(10) Patent No.: US 10,144,331 B2
(45) Date of Patent: Dec. 4, 2018

(54) SEAT WITH INTEGRATED TABLE

(71) Applicant: Toyota Motor Engineering & Manufacturing North America, Inc., Erlanger, KY (US)

(72) Inventors: Charles S. Hansen, Northville, MI (US); Ryan S. Tan, Aurora, CO (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 38 days.

(21) Appl. No.: 15/292,115

(22) Filed: Oct. 12, 2016

(65) Prior Publication Data
US 2018/0099598 A1 Apr. 12, 2018

(51) Int. Cl.
*A47B 39/00* (2006.01)
*A47B 83/02* (2006.01)
*B60N 3/00* (2006.01)
*B60N 2/64* (2006.01)

(52) U.S. Cl.
CPC ............... *B60N 3/004* (2013.01); *B60N 2/64* (2013.01)

(58) Field of Classification Search
CPC .......... B60N 3/002; B60N 3/004; B60N 2/64; B60N 2002/4405
USPC ....... 297/163, 188.04–188.07, 188.2, 188.21
See application file for complete search history.

(56) References Cited

U.S. PATENT DOCUMENTS

| 1,809,866 A * | 6/1931 | Riesche | A47B 5/04 108/116 |
|---|---|---|---|
| 2,963,078 A * | 12/1960 | Ferrelle | B60N 3/004 108/38 |
| 3,596,987 A * | 8/1971 | Wilson | B60N 3/004 297/188.07 |
| 4,791,873 A * | 12/1988 | Towfigh | A47B 5/04 108/10 |
| 5,931,527 A * | 8/1999 | D'Onofrio | B60R 5/045 297/146 |
| 6,085,666 A * | 7/2000 | Anderson | B60N 3/004 108/134 |
| 7,841,473 B2 * | 11/2010 | Huang | A45C 5/03 206/320 |
| 8,303,036 B2 | 11/2012 | Hankinson et al. | |
| 8,434,415 B1 * | 5/2013 | Federici | A47C 7/62 108/38 |
| 2003/0184957 A1 * | 10/2003 | Stahl | B60N 3/004 361/679.1 |
| 2005/0178297 A1 * | 8/2005 | Pipkin | A47B 23/00 108/25 |

(Continued)

*Primary Examiner* — Mark R Wendell
(74) *Attorney, Agent, or Firm* — Christopher G. Darrow; Darrow Mustafa PC (57) ABSTRACT

Vehicle seat assemblies may include a table that is moveable between stowed and operative positions. The table may provide a generally horizontal working surface when in the operative position. The table may be part of an assembly that may be disposed in a cavity in the seat assembly, such as in the rear surface of a seat back. The cavity in the seat assembly may be configured to receive different modules depending on how the seat assembly is to be configured. For example, the seat assembly may receive a table assembly or a trim piece. The trim piece may be used to cover the cavity when a table is not desired as part of the seat assembly.

9 Claims, 8 Drawing Sheets

(56) References Cited

U.S. PATENT DOCUMENTS

| | | | |
|---|---|---|---|
| 2006/0214476 A1* | 9/2006 | Rojas | A47C 4/30 |
| | | | 297/3 |
| 2007/0052264 A1 | 3/2007 | Lee | |
| 2009/0322125 A1* | 12/2009 | Berger | B60R 11/00 |
| | | | 297/188.04 |
| 2011/0109114 A1* | 5/2011 | Kolpasky | B60N 2/01 |
| | | | 296/65.13 |
| 2014/0183910 A1 | 7/2014 | Ulbrich-Gasparevic et al. | |
| 2015/0130231 A1 | 5/2015 | Lindsay et al. | |

\* cited by examiner

SEAT WITH INTEGRATED TABLE

FIELD

The subject matter described herein relates in general to vehicle seat assemblies and, more particularly, to vehicle seat assemblies that have a table.

BACKGROUND OF THE INVENTION

Modern vehicles commonly have seats to secure an occupant while the vehicle is in motion. More specifically, vehicle seats may provide a surface which occupants may sit on in the moving vehicle. For example, vehicle seats commonly include a seat back and a seat bottom, with both the seat back and the seat bottom angled as to comfortably contain the occupant in the moving vehicle. While the vehicle seat is well suited for use when the vehicle is in motion, it would be advantageous to provide a seat that satisfies additional requirements when the vehicle is not in motion. For example, the occupant may desire a flat surface, such as a table, when the vehicle is at rest. Given the space constraints in the vehicle, it would be desirable that the flat surface be stowed so as to not encumber the occupant or useable space when not needed.

SUMMARY

Vehicle seat assemblies may include a table that is moveable between stowed and operative positions. The table may provide a generally horizontal working surface when in the operative position. The table may be part of an assembly that may be disposed in a cavity in the seat assembly, such as in the rear surface of a seat back. The cavity in the seat assembly may be configured to receive different modules depending on how the seat assembly is to be configured. For example, the seat assembly may receive a table assembly or a trim piece. The trim piece may be used to cover the cavity when a table is not desired as part of the seat assembly.

In one respect, the present disclosure is directed to a modular seat assembly for a vehicle. The modular seat assembly includes a seat back, a seat bottom, a trim piece and a table assembly. The seat back has opposite upper and lower ends and opposite front and rear surfaces extending between the upper and lower ends. The front surface is operable to support an occupant seated on the seat assembly. The seat back has a cavity in the rear surface. The seat bottom is adjacent the lower end of the seat back. The seat bottom is operable to support an occupant seated on the seat assembly. The trim piece is operable to be removably coupled to the seat back and covers the cavity when coupled thereto. The table assembly is operable to be removably coupled to the seat back. The table assembly fits at least partially in the cavity. The table assembly includes a frame and a table, with the frame configured to fit at least partially in the cavity. The table is operatively coupled to the frame and moveable between a stowed position and an operative position. The table is generally vertical when in the stowed position and generally horizontal when in the operative position. The table provides a generally horizontal working surface. Only one of the trim piece and the table assembly may be coupled to the seat back at any particular time.

In another respect, the present disclosure is directed to a seat assembly for a vehicle. The seat assembly includes a seat back, a seat bottom and a table assembly. The seat back has opposite upper and lower ends and opposite front and rear surfaces extending between the upper and lower ends. The front surface of the seat back supports an occupant seated on the seat assembly. The seat back has a cavity in the rear surface. The seat bottom is adjacent the lower end of the seat back. The seat bottom is operable to support an occupant seated on the seat assembly. The table assembly is operatively coupled to the seat back. The table assembly fits at least partially in the cavity. The table assembly includes a frame, a pivot assembly, and a table. The frame is configured to fit at least partially in the cavity. The pivot assembly couples the frame to the table. The table is operable to move between a stowed position and an operative position. The table is generally vertical when in the stowed position and generally horizontal when in the operative position. The table provides a generally horizontal working surface. The table has a track within which a first end of an at least one support arm of the pivot assembly may move as the table moves between the stowed and operable position. The second end of the at least one support arm is pivotally coupled to the frame. The at least one support arm at least partially supporting the table when in the operative position.

In yet another respect, the present disclosure is directed to a seat assembly for a vehicle. The seat assembly includes a seat back, a seat bottom and a table. The seat back has opposite upper and lower ends and opposite front and rear surfaces extending between the upper and lower ends. The front surface of the seat back supports an occupant seated on the seat assembly. The seat back has a cavity in the rear surface. The seat bottom is adjacent the lower end of the seat back. The seat bottom supports an occupant seated on the seat assembly. The table assembly is operatively coupled to the seat back. The table assembly fits at least partially in the cavity. The table assembly includes a frame, a pivot assembly, and a table. The frame is configured to fit at least partially in the cavity. The pivot assembly has a pair of support arms coupled to the frame and to the table. The table is operable to move between a stowed position and an operative position. The table is in a generally vertical when in the stowed position and a generally horizontal when in the operative position. The table provides a generally horizontal working surface. The table has opposite sides, with each side having a track extending therealong. A first end of the pair of arms moves within the track as the table moves between the stowed and operative position. Second ends of the pair of support arms are pivotally coupled to the frame. The pair of support arms at least partially supporting the body member when in the operative position.

DETAILED DESCRIPTION

Vehicle seat assemblies may include a table that is moveable between stowed and operative positions. The table may provide a generally horizontal working surface when in the operative position. The table may be part of an assembly that may be disposed in a cavity in the seat assembly, such as in the rear surface of a seat back. The cavity in the seat assembly may be configured to receive different modules depending on how the seat assembly is to be configured. For example, the seat assembly may receive a table assembly or a trim piece. The trim piece may be used to cover the cavity when a table is not desired as part of the seat assembly.

Detailed embodiments are disclosed herein, however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 2A-C and 6A-C, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
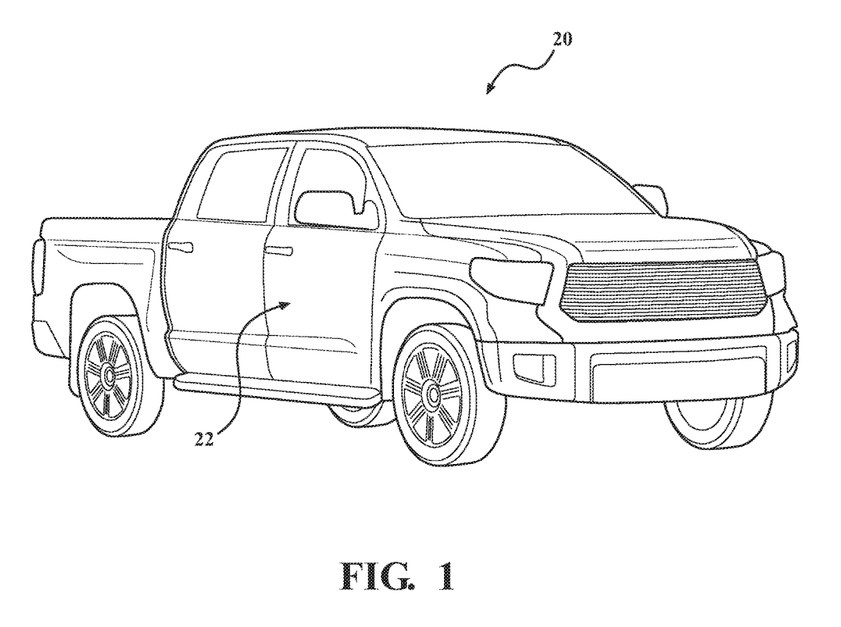
FIG. 1 is a perspective view of an exemplary vehicle in which a seat assembly according to the present disclosure may be utilized.

Referring to FIG. 1, an example of a vehicle 20 is shown. As used herein, "vehicle" means any form of motorized transport. In one or more implementations, vehicle 20 can be an automobile. While arrangements will be described herein with respect to automobiles, it will be understood that embodiments are not limited to automobiles. In some implementations, vehicle 20 may be a watercraft, an aircraft, a train, a space craft or any other form of motorized transport.

Vehicle 20 may define an interior that can be configured to transport one or more occupants. For example, vehicle 20 may generally include a door 22 that may be opened to allow access to an interior compartment therein. In one or more arrangements, vehicle 20 may include one or more seat assemblies 24 operatively connected to a floor of vehicle 20. The term "operatively connected" as used throughout this description can include direct or indirect connections, including connections without direct physical contact. For example, seat assembly 24 may be operatively connected directly to floor or to one or more rails operatively connected to floor.

Figure 2A:
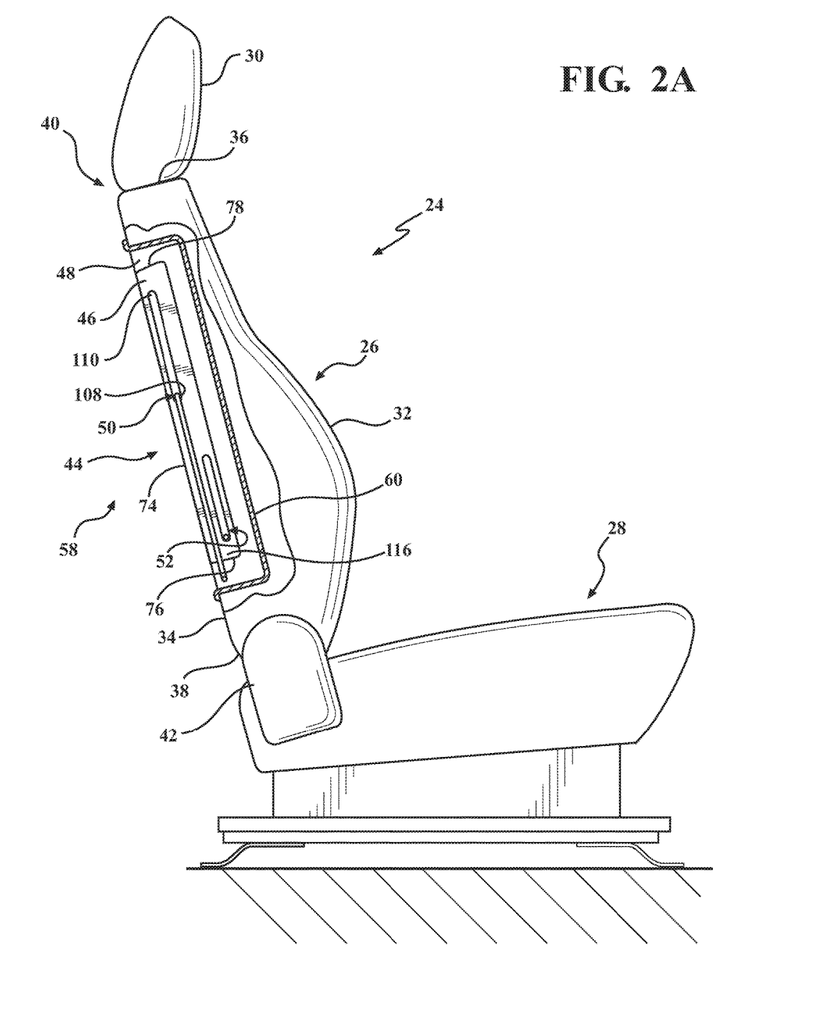
FIGS. 2A-C are side views of a first embodiment of a seat assembly with a table in a stowed, intermediate, and operative position, respectively.
Figure 2B:
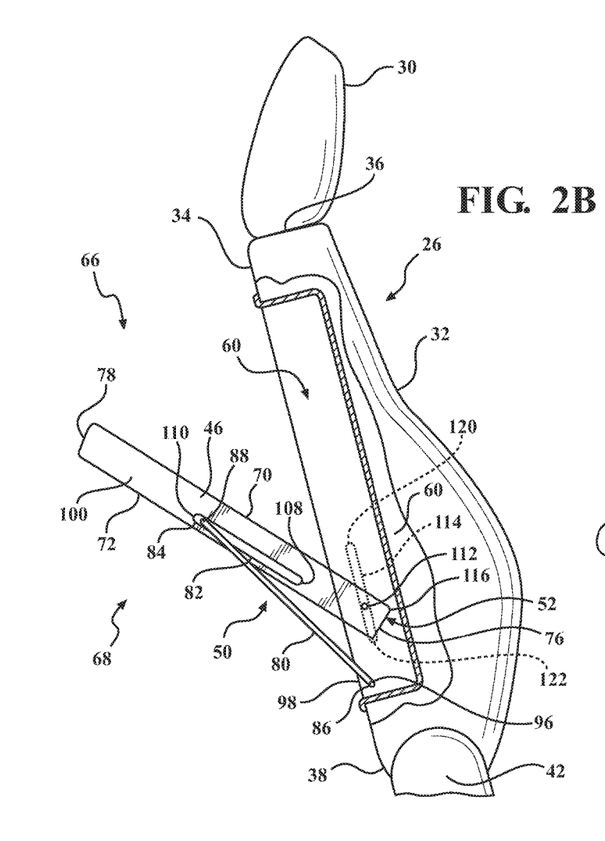
Figure 2C:
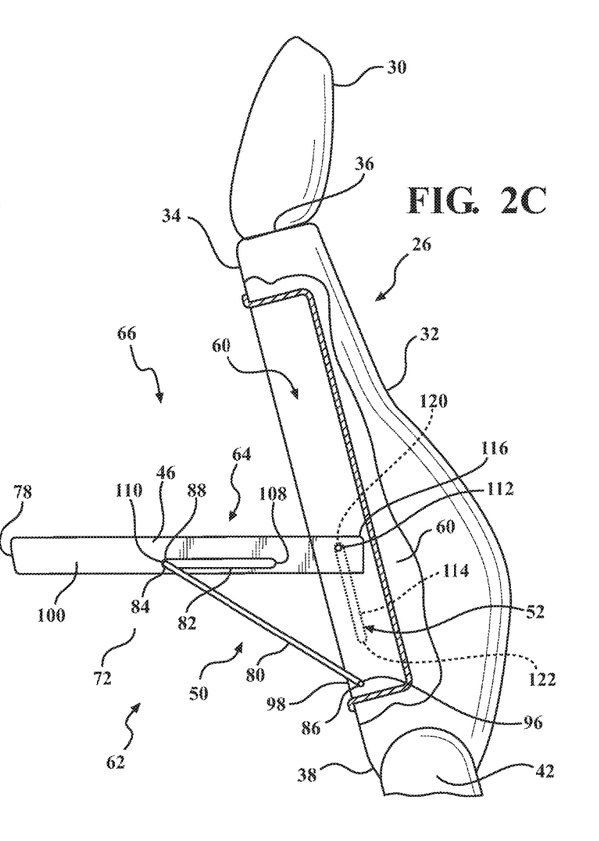

Referring to FIGS. 2A-2C, seat assembly 24 may include features to provide comfort and support for occupant. In one or more arrangements, seat assembly 24 may include a seat back 26, a seat bottom 28 and a head rest 30. Seat back 26 may have a front surface 32 for supporting a seated occupant on seat assembly 24, with a rear surface 34 of seat back 26 opposite front surface 32. Seat back 26 may have opposite upper and lower ends 36, 38, with upper end 36 above lower end 38 when seat back 26 is in a generally vertical position 40. Seat back 26 may be operatively connected to seat bottom 28 via a recliner mechanism 42. Recliner mechanism 42 may be operable to move seat back 26 relative to seat bottom 28 in a forward or a rearward direction.

In one or more arrangements, seat assembly 24 may include a table assembly 44 operatively connected thereto. Referring to FIGS. 2A-2C and 3, table assembly 44 may include a table 46, a frame 48, a pivot assembly 50 and a track assembly 52. Table assembly 44 may, partially or entirely, occupy a cavity 54 in seat back 26 of seat assembly 24. Table assembly 44 may be removable from seat assembly 24. Table assembly 44 may make a lock-fit engagement in seat back 26 such that table assembly 44 is secured within cavity 54 in seat back 26 of seat assembly 24. In the absence of table assembly 44 in vehicle 20, a trim piece 56 or the like may make lock-fit engagement in cavity 54 in seat back 26. To facilitate securing table assembly 44 or trim piece 56 in cavity 54 in seat back 26, latch, lock, clips, detent, screws or the like may be employed. Securing table assembly 44 and trim piece 56 in seat back 26 is not limited to the methods mentioned above and may employ any securing mechanism known to those skilled in the art. Only one of table assembly 44 or trim piece 56 may engage cavity 54 at any given time.

Figure 3:
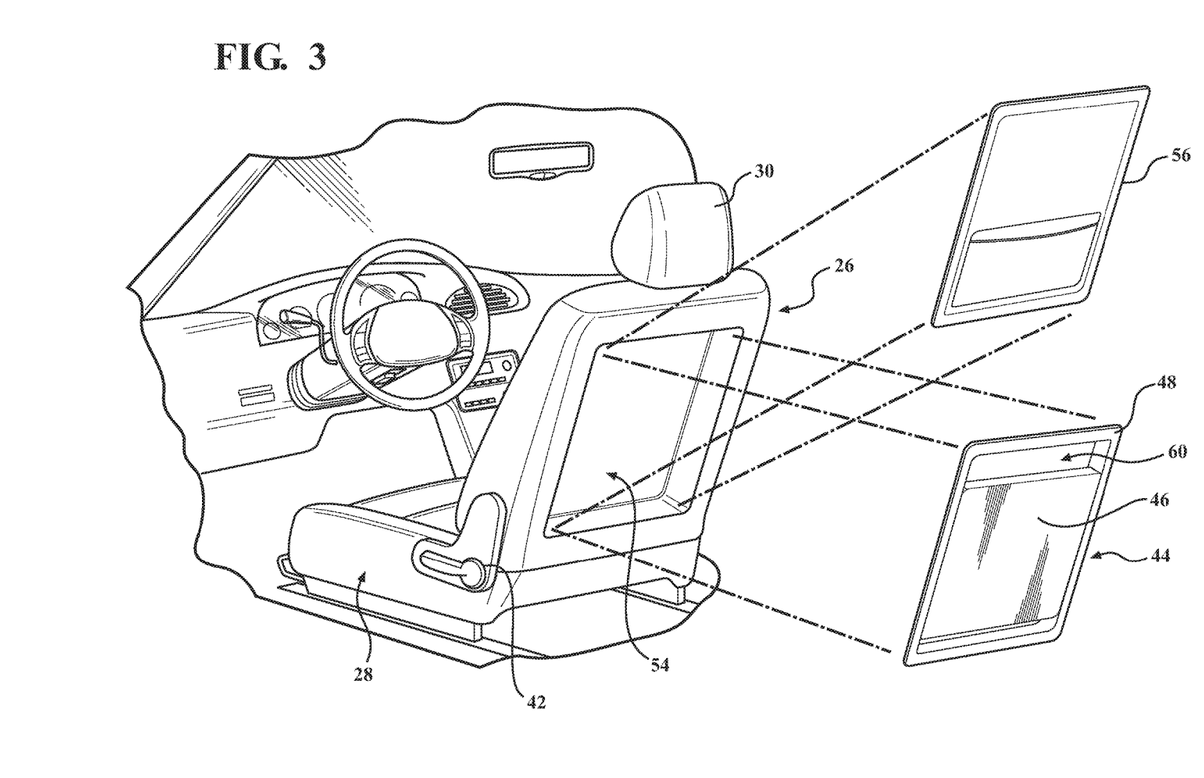
FIG. 3 is a perspective view of the seat assembly showing a cavity in a seat back and the modular insertion of a table assembly or a trim piece.

In one or more arrangements, seat assembly 24, table assembly 44 and trim piece 56 form a modular assembly in which one or more seat backs 26 may be provided with a cavity 54 and either a table assembly 44 or a trim piece 56 secured thereto. In this manner, a common seat back 26 may be utilized with or without a table assembly 44. In one or more arrangements, one or more seat backs 26 may be provided in vehicle 20 with a trim piece 56 coupled thereto. A table assembly 44, if desired, may be purchased or acquired separately. Trim piece 56 may be removed and the acquired table assembly 44 coupled to seat back 26 in its place. It should be appreciated that seat backs 26 may come with table assembly 44 coupled thereto which can be switched out for trim piece 56, if desired. The modular ability allows for a user/owner to customize seat assemblies 24 within vehicle 20.

In one or more arrangements, table 46 may move from a stowed position 58, as shown in FIG. 2A, through intermediate positions 68, such as that shown in FIG. 2B, to an operative position 62, as shown in FIG. 2C. Table 46 folds out from seat back 26 by moving end 78 of table 46 rearwardly and downwardly into space 66. Table 46 may include opposite surfaces 70, 72, with surface 70 facing a space 60 (toward cavity 54) in frame 48 when table 46 is in stowed position 58, and surface 72 facing a space 66 (away from cavity 54) behind rear surface 34 when table 46 is in stowed position 58. Surface 70 may provide a generally horizontal working surface 64 when table 46 is in operative position 62. Table 46 may be attached to frame 40 via pivot assembly 50 and track assembly 52, with pivot assembly 50 and track assembly 52 providing support to table 46. When in stowed position 58, table 46 along with pivot assembly 50 and track assembly 52 may occupy space 60 within frame 48 which may be at least partially or entirely within cavity 54, and thereby not encumber an occupant in vehicle 20. In stowed position 58, surface 70 of table 46 may be flush with rear surface 34 of seat back 26, creating an appearance that table 46 is integrated into seat back 26. Table 46, when in operative position 62, may provide generally horizontal working surface 64 for an occupant in vehicle 20. When in operative position 62, table 46 and a portion of pivot assembly 50 may extend into space 66 proximate rear surface 34 of seat back 26 in vehicle 20. Table 46 may be locked in stowed position 58 and operative position 62.

In one or more arrangements, surface 70 may further include a removable top to allow for cleaning, replacement or the like. Surface 72 may provide a trim face 74 when table 46 is in stowed position 58, as shown in FIG. 2A. In stowed position 58, trim face 74 may be flush with rear surface 34 of seat back 26. Table 46 may include opposite ends 76, 78. As shown in FIG. 2A, end 76 of table 46 may be adjacent lower end 38 of seat back 26 and end 78 of table 46 may be adjacent upper end 36 of seat back 26 when table 46 is in stowed position 58.

In one or more arrangements, frame 48 may provide support to table 46. One mechanism of support may include securing table 46 to seat assembly 24. Frame 48 makes lock-fit engagement in seat back 26, with lock-fit engagement operatively connecting table assembly 44 to seat assembly 24. Thereby when a load is applied to generally horizontal working surface 64, the force exerted by the load is counterbalanced by seat assembly 24. An additional mechanism of support may include pivot assembly 50 and track assembly 52 securing table 46 to frame 48, thereby promoting stability and allowing for a discreet range of motion of table 46.

Figure 4A:
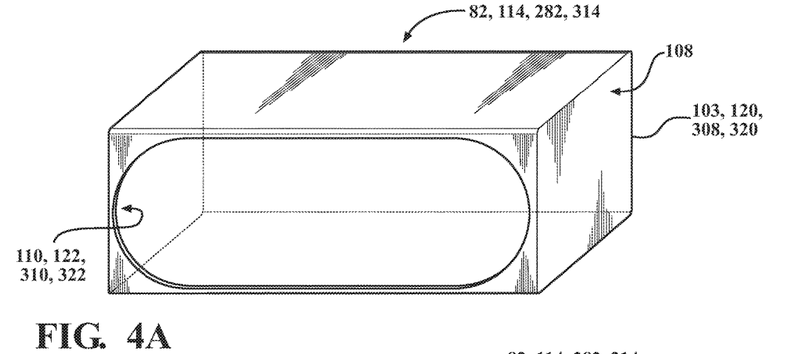
FIGS. 4A-C are perspective views of a track that may be employed with a pivot assembly and a track assembly, with the track having closed ends, being a U-shaped channel, and being a C-shaped channel, respectively.
Figure 4B:
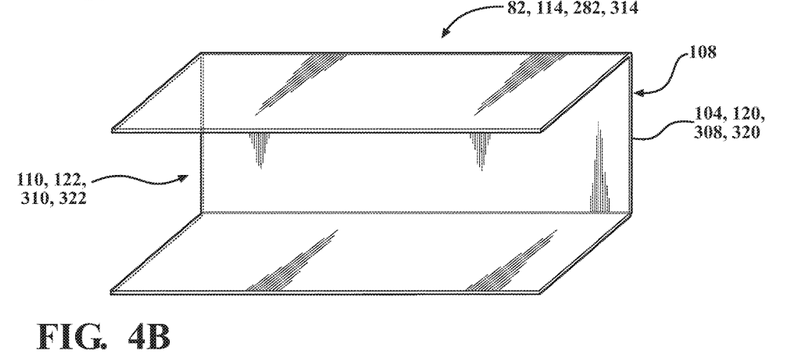
Figure 4C:
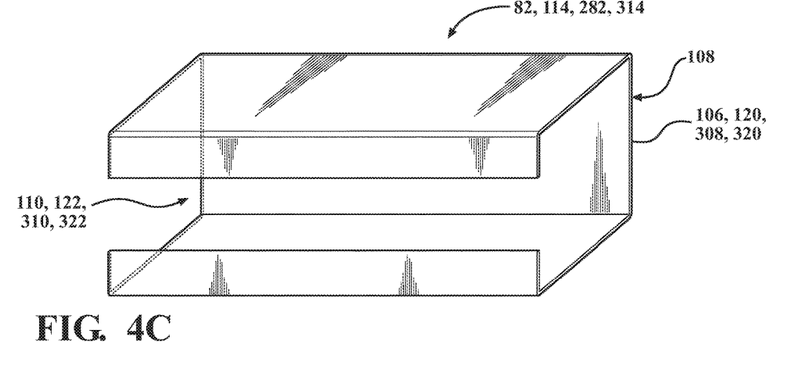
Figure 5A:
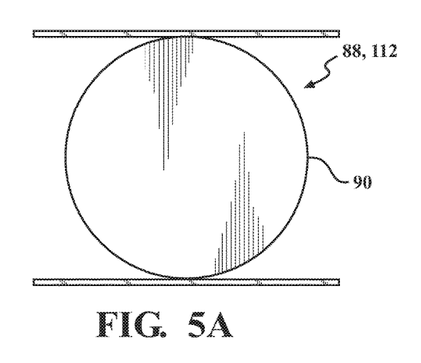
FIGS. 5A-C are front views of a member that may engage the track in the pivot assembly and track assembly, with the member being a pin, being a roller bearing and being a slidable block, respectively.
Figure 5B:
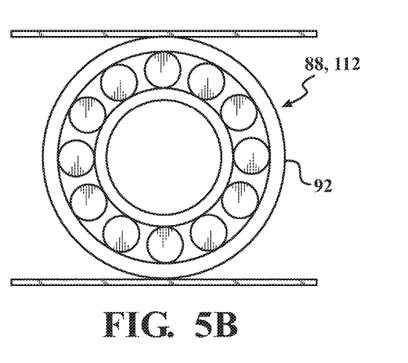
Figure 5C:
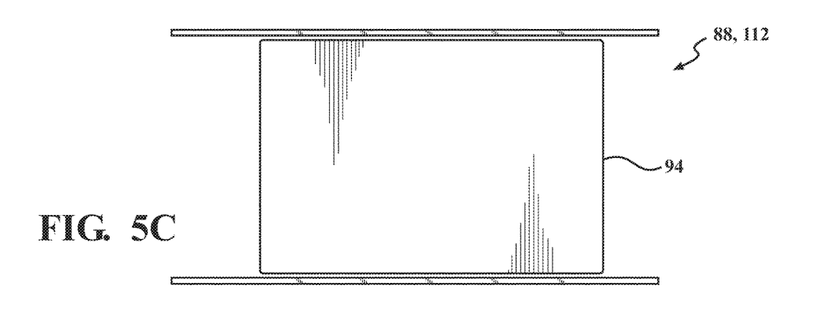

In one or more arrangements, pivot assembly 50 may secure table 46 to frame 48 and at least partially support table 46. As shown in FIG. 2C, pivot assembly 50 includes a support arm 80 and a track 82. Support arm 80 has opposite ends 84, 86. One end 84 of support arm 80 may be affixed to a pivot member 88. Pivot member 88 may be, by way of non-limiting example, a pin 90, a roller bearing 92, or a block 94, as shown in FIGS. 5A-5C, respectively. Pivot member 88 is not limited to the aforementioned structures and may be any structure known to those skilled in the art that may roll, slide or move along track 82. Another end 86 of support arm 80 may be affixed to a fixed pivot 96, with fixed pivot 96 operatively connected to a lower end 98 of frame 48. Track 82 may be affixed along a side 100 of table 46. In one or more arrangements, track 82 may be affixed along a central portion of table 46. As shown in FIGS. 4A-4C, track 82 may, respectively, be a closed end channel 103, a U-shaped channel 104, or a C-shaped channel 106, by way of non-limiting example. Track 82 has opposite ends, 108, 110. Ends 108, 110 may be closed ends, as shown in FIG. 4A or may be open ends, as shown in FIGS. 4B and 4C. End 108 is proximate end 76 of table 46, and end 110 is proximate end 78 of table 46. It should be appreciated that track 82 is not limited to the aforementioned structures and may be, by way of non-limiting example, any structure known to those skilled in the art, such as a T-shaped channel, slot or a recess along side 100 of table 46.

In one or more arrangements, pivot member 88 securely engages track 82. Pivot member 88 is operable to move along track 82 as table 46 moves between stowed 58 and operative 62 positions. Movement of pivot member 88 along track 82 may be facilitated by manual movement of table 46. Alternatively, movement of pivot member 88 along track 82 may be facilitated by a motor, spring, pulley or other mechanism known to those skilled in the art. Pivot member 88 may move along a length of track 82, with pivot member 88 inhibited from movement beyond both ends 108, 110 of track 82 due to pivot member 88 encountering flat or rounded end, a stop member or the like. Pivot member 88 may make a flush contact with ends 108, 110 of track 82. The abutment of pivot member 88 and either end 108, 110 of track 82 is operable to support a load applied when table 46 engages either stowed position 58 or operative position 62. Pivot member 88 may be locked when in contact with either end 108, 110 of track 82 using a detent, a groove, a latch or the like.

In one or more arrangements, track assembly 52 may secure table 46 to frame 48 and at least partially support table 46. As shown in FIG. 2C, track assembly 52 may include a pin member 112 and a track 114. Pin member 112 may be affixed to side 100 of table 46. Pin member 112 may be proximate an upper corner 116 of table 46, near end 76 and surface 70 of table 46. As shown in FIGS. 5A-5C, by way of non-limiting example, pin member 112 may be one of pin 90, roller bearing 92, or block 94, respectively. Additionally, pin member 112 is not limited to the aforementioned structures and may be any structure known to those skilled in the art that may roll, slide or move along track 114.

In one or more arrangements, track 114 is affixed to frame 48. In one or more arrangements, track 114 may be proximate a lower portion of frame 48, with orientation of track 114 being parallel to a length of frame 48. Track 114 may be the same as or similar to track 82 discussed above. Track 114 has opposite ends 120, 122. Ends 120, 122 of track 114 may be similar to ends 108, 110 of track 82. Pin member 112 securely engages track 82, whereby pin member 112 is operable to move along track 114 as table 46 moves between stowed 58 and operative 62 positions. Movement of pin member 112 along track 114 may be facilitated by manual movement of table 46. Alternatively, movement of pin member 112 along track 114 may be similar to movement of pivot member 88 along track 82.

In one or more arrangements, table assembly 44 may move between stowed position 58 and operative position 62. With table 46 starting in stowed position 58, end 78 of table 46 moves toward a floor of vehicle 20, into space 66 behind seat back 26, as end 76 of table 46 moves toward a ceiling of vehicle 20, into space 60 inside frame 48 in seat back 26. This movement culminates with table 46 being in operative position 62. As shown in FIG. 2A, in stowed position 58, pivot member 88 attached to end 84 of support arm 80 may abut end 108 of track 82. Additionally, in stowed position 58, pin member 112 of table 46 may abut end 122 of track 114. When these events occur at the same time, table 46 is secured in stowed position 58. As table 46 moves to the operative position 62, pivot member 88 moves away from end 108 of track 82, toward end 110 of track 82. At the same time, pin member 112 moves away from end 122 of track 114, toward end 120 of track 114. When neither pivot member 88 nor pin member 112 abut an end of track, 82 and 114, respectively, table 46 is not secured in either stowed position 58 or operative position 62. In such a condition, table 46 is in intermediate position 68, such as that shown in FIG. 2B. In operative position 62, pivot member 88 at end 84 of support arm 80 abuts end 110 of track 82, as shown in FIG. 2C. At the same time, pin member 112 of table 46 abuts end 118 of track 114. In both stowed position 58 and operative position 62, pivot member 88 and pin member 112 may be secured in position using detent, clip, groove or the like.

Figure 6A:
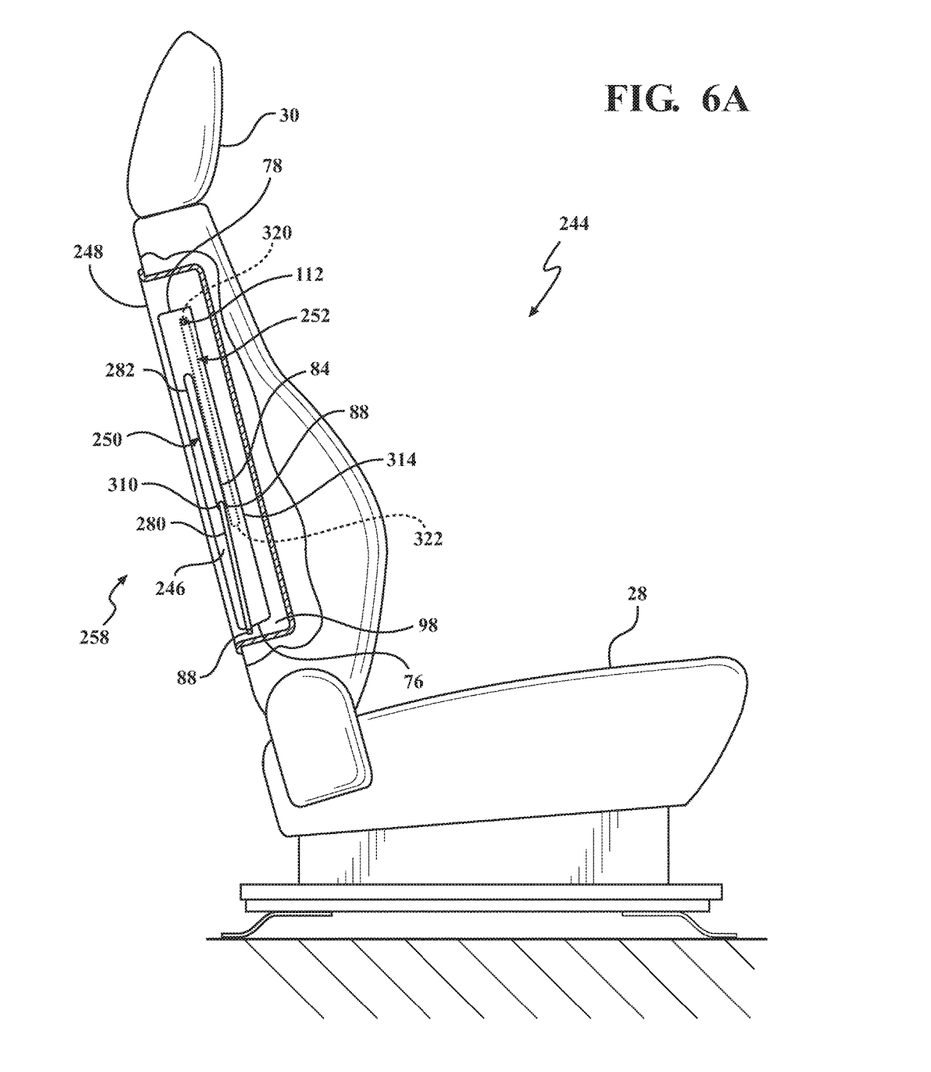
FIGS. 6A-C are side views of a second embodiment of a seat assembly with a table in a stowed, intermediate, and operative position, respectively.
Figure 6B:
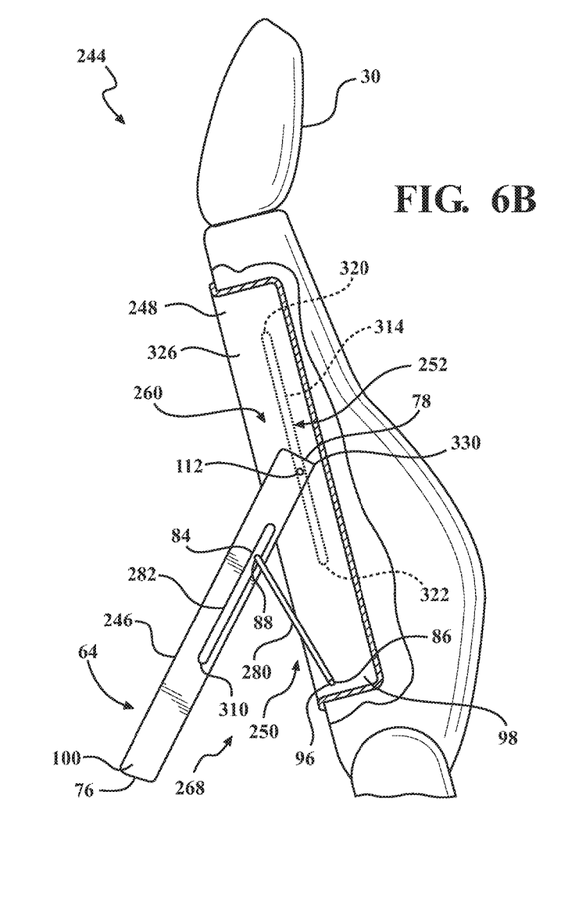
Figure 6C:
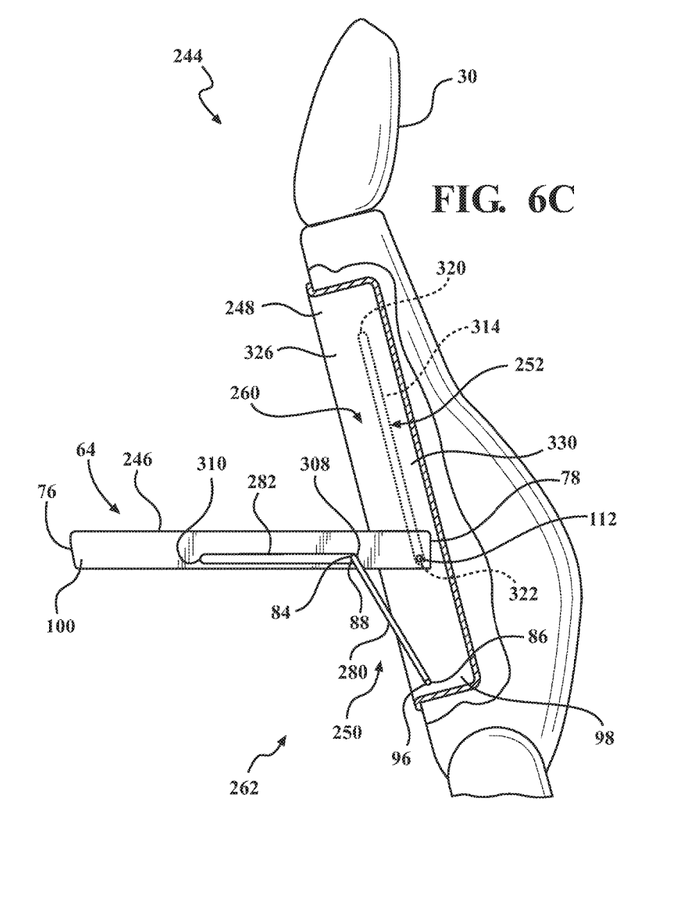

In a second embodiment of the invention, as shown in FIGS. 6A-6C, the table assembly 244 may move from stowed position 258 to operative position 262 in a different manner. Specifically, table 246 folds out from seat back 26 by moving end 78 of table 246 forwardly and downwardly into space 60 while end 76 moves rearwardly and upwardly into space 66. Table assembly 244 may include table 246, a frame 248, a pivot assembly 250 and a track assembly 252. The structural components of the table assembly 244 in the second embodiment are similar to those of the table assembly 44 in the first embodiment, with a few notable exceptions. Differences between the first and second embodiments relate to the location of the pivot assembly 250 and track assembly 252 in each embodiment, and structural differences in tracks 282, 314 and support arm 280. Additionally, the surface of table 246 facing away from space 260 in seat back 26 when in stowed position 258 forms the generally horizontal working surface 64 when in operative position 262.

In one or more arrangements, pivot assembly 250 may secure table 246 to frame 248 and at least partially support table 246. As shown in FIG. 6C, pivot assembly 250 includes a support arm 280 and a track 282. Support arm 280 has opposite ends 84, 86. One end 84 of support arm 80 may be affixed to a pivot member 88. Pivot member 88 may be, by way of non-limiting example, a pin 90, a roller bearing 92, or a block 94, as shown in FIGS. 5A-5C, respectively. Pivot member 88 is not limited to the aforementioned structures and may be any structure known to those skilled in the art that may roll, slide or move along track 282. Another end 86 of support arm 280 may be affixed to a fixed pivot 96, with fixed pivot 96 operatively connected to a lower end 98 of frame 248. Track 282 may be affixed along a side 100 of table 246. As shown in FIGS. 4A-4C, track 282 may, respectively, be a closed end channel 103, a U-shaped channel 104, or a C-shaped channel 106, by way of non-limiting example. Track 282 has opposite ends, 308, 310. Ends 308, 310 may be closed ends, as shown in FIG. 4A or may be open ends as shown in FIGS. 4B and 4C. End 308 is proximate end 76 of table 246, and end 310 is proximate end 78 of table 46. It should be appreciated that track 282 is not limited to the aforementioned structures and may be, by way of non-limiting example, any structure known to those skilled in the art, such as a T-shaped channel, slot or a recess along side 100 of table 246.

In one or more arrangements, pivot member 88 securely engages track 282. Pivot member 88 is operable to move along track 282 as table moves between stowed 258 and operative 262 positions. Movement of pivot member 88 along track 282 may be facilitated by manual movement of table 246. Alternatively, movement of pivot member 88 along track 282 may be facilitated by a motor, spring, pulley or other mechanism known to those skilled in the art. Pivot member 88 may move along a length of track 282, with pivot member 88 inhibited from movement beyond both ends 308, 310 of track 282 due to pivot member 88 encountering flat or rounded end, stop member or the like. Pivot member 88 may make a flush contact with ends 308, 310 of track 282. The abutment of pivot member 88 and either end 308, 310 of track 282 is operable to support a load applied when table 246 engages either stowed position 258 or operative position 262. Pivot member 88 may be lockable when in contact with either end 308, 310 of track 82 using detent, groove, latch or the like.

In one or more arrangements, track assembly 252 may secure table 246 to frame 248 and at least partially support table 246. As shown in FIG. 6C, track assembly 252 may include a pin member 112 and a track 314. Pin member 112 may be affixed to side 100 of table 246. Pin member 112 may be proximate a lower corner 330, near end 76 of table 246. As shown in FIGS. 5A-5C, by way of non-limiting example, pin member 112 may be one of pin 90, roller bearing 92, or block 94, respectively. Additionally, pin member 112 is not limited to the aforementioned structures and may be any structure known to those skilled in the art that may roll, slide or move along track 314.

In one or more arrangements, track 314 is affixed to frame 248. Track 314 may be proximate an upper portion 326 of frame 248, with orientation of track 314 being parallel to length of frame 248. Track 314 may be the same or similar to track 282 discussed above. Track 314 has opposite ends 320, 322. Ends 320, 322 of track 314 may be similar to ends 308, 310 of track 282. Pin member 112 securely engages track 314, whereby pin member 112 is operable to move along track 314 as table 246 moves between stowed 258 and operative 262 positions. Movement of pin member 112 along track 314 may be facilitated by manual movement of table 246. Alternatively, movement of pin member 112 along track 314 may be similar pivot member 88 along track 282.

In one or more arrangements, table assembly 244 may move between stowed position 258 and operative position 262. With table 246 starting in stowed position 258, end 78 of table 246 moves toward floor of vehicle 20, into space 260 inside frame 248 in seat back 26, as end 76 of table 246 moves toward ceiling of vehicle 20, into space 66 behind seat back 26. This movement culminates with table 246 being in operative position 262. As shown in FIG. 6A, in stowed position 258, pivot member 88 attached to end 84 of support arm 280 may abut end 310 of track 282. Additionally, in stowed position 258, pin member 112 of table 246 may abut end 320 of track 314. When these events occur at the same time, table 246 is secured in stowed position 258. As table 246 moves to operative position 262, pivot member 88 moves away from end 310 of track 282, toward end 308 of track 282. At the same time, pin member 112 moves away from end 320 of track 314, toward end 322 of track 114. When neither pivot member 88 nor pin member 112 abut an end of track, 282 and 314, respectively, table 246 is not secured in either stowed position 258 or operative position 262. In such a condition, table 246 is in intermediate position 268, as in FIG. 6B. In operative position 262, pivot member 88 at end 84 of support arm 280 abuts end 308 of track 282, as shown in FIG. 6C. At the same time, pin member 112 of table 246 abuts end 322 of track 314. In both stowed position 258 and operative position 262, pivot member 88 and pin member 112 are secured in position using a detent, clip, groove or the like.

In one or more arrangements, table assembly 44 may be operable when removed from seat assembly 24. When removed from seat assembly 24, table assembly 44 may engage a component distinct from components in vehicle 20 such as, by non-limiting example, a base member. The base member may be associated with some other location or structure, such as a wall in a home by way of non-limiting example, that allows table assembly 44 to be inserted therein and secured thereto so that table assembly 44 is operable to move between stowed and operative positions while secured to the base member. The base member may have a shape and structure and function distinct from seat assembly 24. The base member may have a cavity similar to or the same as cavity 54 in seat back 26, thereby allowing for lock-fit engagement of table assembly 44 in the cavity. The equivalence of dimensions of the cavity in the base member ensures that table assembly 44 retains functionality outside of vehicle 20. Additionally, a structure that performs the same function as the cavity may be employed. Table assembly 44 may engage any of the one or more seat assemblies 24 in vehicle 20, provided seat assemblies 24 have equivalent dimensions of a cavity allowing for lock-fit engagement of table assembly 44.

In one or more arrangements, working surface 64 may by concave or include indentations to facilitate holding things thereon and reduce the possible of the things falling off working surface 64. In one or more arrangements, table assembly 44, 244 may include straps that can selectively extend over working surface 64 to facilitated holding things thereon. In one or more arrangements, working surface 64 may be padded or be a cushioned surface.

In one or more arrangements, the table assemblies described herein may have a pair of pivot assemblies and a pair of track assemblies. In this case, a pivot assembly and a track assembly are associated with opposite sides of the table to provide support for both sides of the table and provide additional guidance during movement between the stowed and operative positions. In this arrangement, the pivot assemblies and track assemblies may be symmetrical, on opposite side of the table assembly.

Aspects herein can be embodied in other forms without departing from the spirit or essential attributes thereof. Accordingly, reference should be made to the following claims, rather than to the foregoing specification, as indicating the scope of the invention.

What is claimed is:

1. A seat assembly comprising:
   a seat back having opposite upper and lower ends and opposite front and rear surfaces extending between the upper and lower ends, the front surface supporting an occupant seated on the seat assembly, the seat back having a cavity in the rear surface;
   a seat bottom adjacent the lower end of the seat back and supporting an occupant seated on the seat assembly; and
   a table assembly operable to be coupled to the seat back and fit at least partially in the cavity, the table assembly including a frame, a pivot assembly, and a table, the frame configured to fit at least partially in the cavity, the pivot assembly coupling the frame to the table, the table operable to move between a stowed position and an operative position, the table being generally vertical when in the stowed position and being generally horizontal when in the operative position and providing a generally horizontal working surface,
   wherein the table has a track within which a first end of an at least one support arm of the pivot assembly may move as the table moves between the stowed and operable position and a second end of the at least one support arm is pivotally coupled to the frame, the at least one support arm at least partially supporting the table when in the operative position, and
   wherein the table assembly further comprises a track assembly having at least one pin member affixed to a side of the table so as to move correspondingly with the table, the at least one pin member operatively connecting the table to the frame.

2. The seat assembly of claim 1, wherein the at least one support arm extends generally outwardly from the frame when the table is in the operative position and being tucked on the side of the table when in the stowed position.

3. The seat assembly of claim 1, wherein the track is on a side of the table, the first end of the at least one support arm is attached to a pivot member and the pivot member is in a slideable engagement in the track.

4. The seat assembly of claim 1, wherein the at least one pin member is in a slideable engagement in a track affixed to the frame.

5. The seat assembly of claim 1, wherein the track assembly has a pin member affixed to each side of the table, each pin member operatively connecting the table to the frame, with each pin member making a slideable engagement in an associated track affixed to the frame, and wherein the pivot assembly and track assembly are operable to move the table between the operative position and the stowed position, both the pivot assembly and the track assembly at least partially supporting the table when in the operative position.

6. The seat assembly of claim 1, wherein the frame makes a secure engagement in cavity in seat back, with the frame supporting both the pivot assembly and the track assembly.

7. The seat assembly of claim 1, wherein the table has a first surface and a second surface, the first surface facing outwardly when in the stowed position, the second surface facing the cavity when in the stowed position, and the second surface being the generally horizontal working surface when the table is in the operative position.

8. A seat assembly comprising:
   a seat back having opposite upper and lower ends and opposite front and rear surfaces extending between the upper and lower ends, the front surface supporting an occupant seated on the seat assembly, the seat back having a cavity in the rear surface;
   a seat bottom adjacent the lower end of the seat back and supporting an occupant seated on the seat assembly; and
   a table assembly operable to be coupled to the seat back and fit at least partially in the cavity, the table assembly including a frame, a pivot assembly, and a table, the frame configured to fit at least partially in the cavity, the pivot assembly coupling the frame to the table, the table operable to move between a stowed position and an operative position, the table being generally vertical when in the stowed position and being generally horizontal when in the operative position and providing a generally horizontal, upwardly-facing working surface,
   wherein the table has a track within which a first end of an at least one support arm of the pivot assembly may move as the table moves between the stowed and operable position and a second end of the at least one support arm is pivotally coupled to the frame, the at least one support arm at least partially supporting the table when in the operative position, and
   wherein the table has a first surface and a second surface, the first surface facing outwardly when in the stowed position, the second surface facing the cavity when in the stowed position, and the first surface being the generally horizontal, upwardly-facing working surface when the table is in the operative position.

9. A seat assembly comprising:
   a seat back having opposite upper and lower ends and opposite front and rear surfaces extending between the upper and lower ends, the front surface supporting an occupant seated on the seat assembly, the seat back having a cavity in the rear surface;
   a seat bottom adjacent the lower end of the seat back and supporting an occupant seated on the seat assembly; and
   a table assembly operable to be coupled to the seat back and fit at least partially in the cavity, the table assembly including a frame, a pivot assembly, and a table, the frame configured to fit at least partially in the cavity, the pivot assembly having a pair of support arms operatively coupled to the frame and to the table, the table operable to move between a stowed position and an operative position, the table being generally vertical when in the stowed position and being generally horizontal when in the operative position and providing a generally horizontal working surface, wherein the table has opposite sides each having a track extending therealong within which first ends of the pair of arms move as the table moves between the stowed and operative positions, second ends of the pair of support arms are pivotally coupled to the frame, and the pair of support arms at least partially supporting the body member when in the operative position, and wherein the table assembly further comprises a track assembly having a pin member affixed to each side of the table, the pin member operatively connecting the table to the frame, with the pin member making a slideable engagement in a track affixed to the frame.

\* \* \* \* \*